(12) United States Patent
Yang

(10) Patent No.: US 8,448,380 B1
(45) Date of Patent: May 28, 2013

(54) WICKNET

(76) Inventor: Chauming Yang, Fremont, CA (US)

( * ) Notice: Subject to any disclaimer, the term of this patent is extended or adjusted under 35 U.S.C. 154(b) by 593 days.

(21) Appl. No.: 12/462,393

(22) Filed: Aug. 4, 2009

(51) Int. Cl.
*A01G 25/00* (2006.01)

(52) U.S. Cl.
USPC ................................ 47/79; 47/81; 47/66.7

(58) Field of Classification Search
USPC .......... 47/81, 79, 80, 66.7, 65, 65.5; 222/187; 239/34
IPC ............................................ A01G 27/04,27/06
See application file for complete search history.

(56) References Cited

U.S. PATENT DOCUMENTS

| | | | | |
|---|---|---|---|---|
| 1,400,628 A | * | 12/1921 | Rudolph | 47/81 |
| 2,799,121 A | * | 7/1957 | Modeweg | 47/80 |
| 3,369,543 A | * | 2/1968 | Ronco | 604/2 |
| 3,819,284 A | * | 6/1974 | Kreuzer | 401/151 |
| 4,741,125 A | * | 5/1988 | Demorest | 47/81 |
| 4,782,627 A | * | 11/1988 | Hauk | 47/81 |
| 4,926,585 A | * | 5/1990 | Dreschel | 47/64 |
| 4,934,096 A | * | 6/1990 | Bentvelsen | 47/62 N |
| 4,999,947 A | * | 3/1991 | Whitaker | 47/81 |
| 6,044,585 A | * | 4/2000 | Carruth et al. | 47/65.5 |
| 6,568,425 B2 | * | 5/2003 | Gergek | 137/565.16 |
| 2004/0098912 A1 | * | 5/2004 | Searle et al. | 47/65.5 |
| 2005/0204624 A1 | * | 9/2005 | Lozano Teruel et al. | 47/81 |
| 2008/0035753 A1 | * | 2/2008 | Sheldrake et al. | 239/50 |
| 2009/0064576 A1 | * | 3/2009 | Sugarek | 47/81 |

* cited by examiner

*Primary Examiner* — Andrea Valenti

(57) ABSTRACT

A wicktube can transfer liquid from one end to the other end by capillary action, and a wickswitch can control this capillary liquid transferring action. Wicktubes are connected together to form a wickhub. A wicknet combines wickhubs, wicktubes, and liquid reservoirs to form a network. Wickconnectors connect the elements of the wicknet. Wicknet and wickswitches can control the liquid supply of the plants in a garden or farm. This liquid supply control can be precise if electronic controller and some sensors are added. It is simple, slow and clean. And it uses only minimum amount of liquid. Plants can be hung on the wall to form a garden on the wall, a hanging garden.

16 Claims, 13 Drawing Sheets

Wickswitch OF | Wickswitch ON | Wickswitch OFF | Wickswitch ON | Wickswitch OFF
(Stopped) | (transferring liquid) | (stopped) | (transferring liquid) | (stopped)

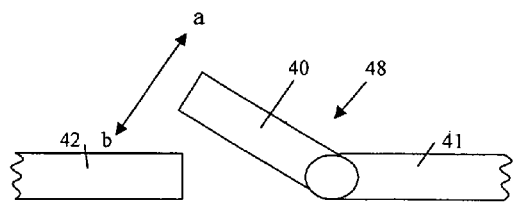
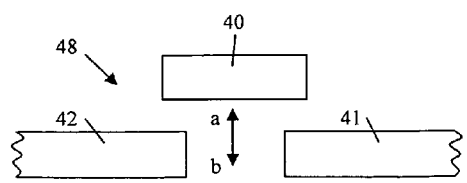
FIG. 2
FIG. 3
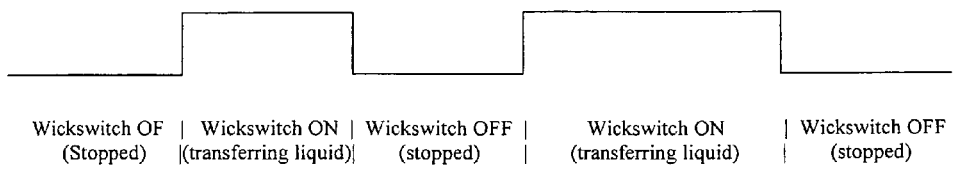
FIG. 4
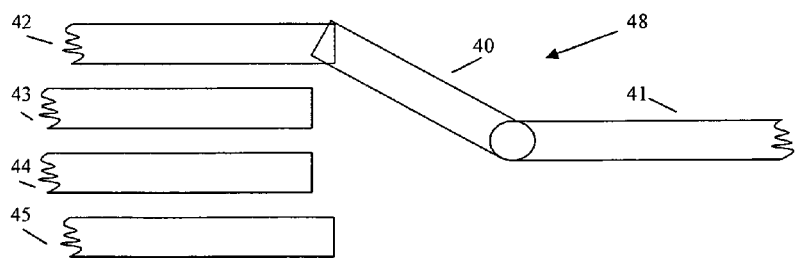
FIG. 5

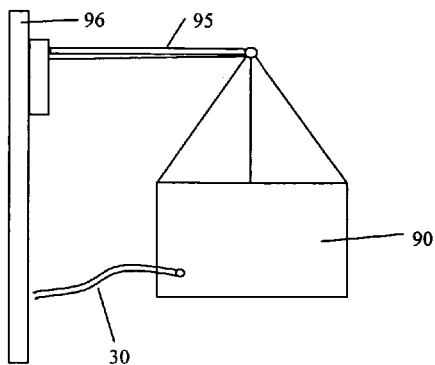
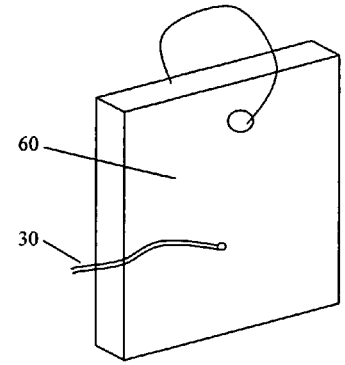
FIG. 15          FIG. 16
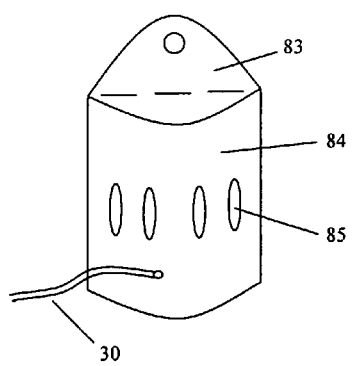
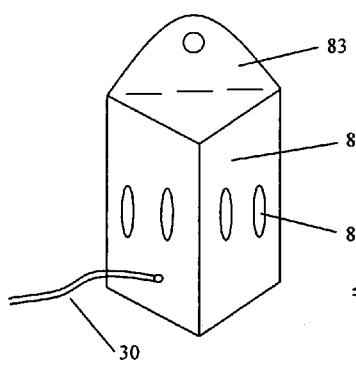
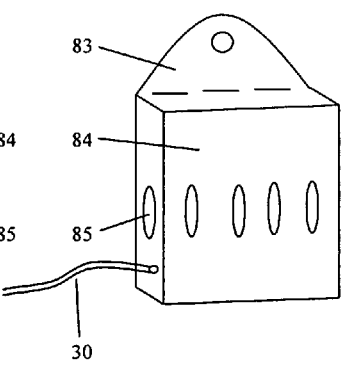
FIG. 17      FIG. 18      FIG. 19

WICKNET

BRIEF SUMMARY OF THE INVENTION

A wicktube is a tube with a liquid absorbing core inside the tube, so the wicktube can transfer the liquid from one end to the other end by capillary action. The wicktube can be used for transferring the liquid from a liquid reservoir to plants. But different plants have different watering schedules. A wickswitch can be turned on or off. So by means of the wickswitch, the liquid transferring can be started or stopped. This capillary liquid transferring action can be controlled.

Wicktubes are connected together to form a wickhub. A wicknet combines wickhubs, wicktubes, and liquid reservoirs to form a network. Wickconnectors connect the elements of the wicknet. Wicknet and wickswitches can control the liquid supply to the plants in a garden or farm. This liquid supply control can be precise if electronic controller and some sensors are added. Just like power net use its driving force, voltage difference, to supply electrical current to electrical devices. Wicknet use its driving force, capillary action, to supply liquid to plants.

Gardens usually need land, but a hanging garden does not need it. Hanging garden uses the wall, a so far rarely used space. Because capillary action can transfer liquid in a vertical direction, so it is suitable for the garden on the wall. Then every building, every house, even every room can have its own beautiful, private hanging garden. And it is easy to maintain this garden. A green room, green house, green school, green office, green factory, green airport, even green mall shall not be too far from us now.

Some mount devices and hanging pots which use wicktube for plants are invented. Some plants, like orchids, need better root airflow. So a window concept is used for some pots. This concept is a variable size hole for the pot.

OBJECTS OF THE INVENTION

The principal object of the present invention is to solve the most trouble some work in gardening, watering plants and land. Different plants have different watering schedules. Some plants need watering every week, some plants even need watering everyday, but some plants do not need watering often. The wicknet concept simplifies this plant watering work. If wickswitches, electronic controllers and some sensors are added to the wicknet system, each individual plant can have its own watering plan according to an expert's suggestion. And it is easy to maintain this garden. Hanging garden does not need land.

BACKGROUND OF THE INVENTION

1. Field of the Invention
This invention relates to a controllable self-watering system for plants by capillary action.
2. Description of the Prior Art
U.S. Pat. No. 4,339,891. Inventors: Bassett; Ronald M. (Chicago, Ill.), application Ser. No. 06/194,554, Filed: Oct. 6, 1980. A device for supporting a plant contained in a pot, and having a water reservoir and wick having a portion thereof retained in the water reservoir and a portion thereof extending into the soil of the pot.
U.S. Pat. No. 4,557,071. Inventors: Fah; Ah N. (Seremban N. S., MY), application Ser. No. 06/617,985, Filed: Jun. 6, 1984. A watering and feeding system for plants, comprising a container enclosing a platformed water reservoir, housing a water supply unit, a fertilizer dispensing unit, a nutrient conveying wick and a water level indicator unit, all of which are interacting to provide automatic and adequately measured amounts of nutrients to the plants, embedded in soil on top of the platformed water reservoir.
U.S. Pat. No. 4,996,792. Inventors: Holtkamp, Sr.; Reinhold (D-4294 Isselburg, DE), application Ser. No. 07/504,054, Filed: Apr. 4, 1990. A plant watering container comprised of lower and upper mating container sections. The top wall of the upper section is formed with a central opening for supporting a pot, with a wick extending into the growing media in the bottom of the pot and downwardly into the water reservoir provided by the lower container section.
U.S. Pat. No. 5,046,282. Inventors: Whitaker; Dale (Hacienda Height, Calif.), application Ser. No. 07/534,694, Filed: Jun. 6, 1990. An automatic soil waterer, especially for potted plants, having an airtight water supply chamber with a discharge into the soil controlled by a hydrophilic probe element followed by a hydrophobic element, preferably with an entrapment chamber therebetween, passing soil air into the water supply chamber, thereby discharging a proportional amount of water into the soil, there being water discharge control by means of a well open to the water supply chamber discharge and with a capillary wick therein exposed to the rise of water in the well and extending into the soil to wet the same.
U.S. Pat. No. 5,375,371. Inventors: Wells; Anthony L. (Singapore, SG), application Ser. No. 07/937,291, Filed: Aug. 31, 1992. An improved watering system consists of a water supply, an area of soil, vegetation within the area of soil and a mechanism for conveying water from the water supply by capillary action to the vegetation within the area of soil, so that the vegetation can grow normally within the soil.

Every invention of these prior art has only 1 kind of watering method and some are also limited by its target, like only for pots. But different plant needs different watering method, some need watering often and some do not. So the user must choose suitable plants for the design of these prior art invention. Then what can they do if the surrounding change, like temperature or humidity change?

My invention is simple. Computer controlled wickswitch supply liquid to any kind of target, pots or mount devices or baskets. Computer program fits user's plant watering requirement according to expert's suggestion. The watering method change when temperature or humidity change if some sensors are added. The watering method can be modified easily, just change some parameters or computer program. So the plant chosen do not have to fit the invention but my invention fit their choice. Let smart computer take care of everything.

BRIEF DESCRIPTION OF THE DRAWINGS

FIG. 2 is a cross sectional plan view of a two pole wickswitch.

FIG. 3 is a cross sectional plan view of another two pole wickswitch.

FIG. 4 is a timing diagram of a wickswitch.

FIG. 5 is a cross sectional plan view of a multiple pole wickswitch.

FIG. 15 is the front view of a hanging box, or basket.

FIG. 16 is the front view of a mount device.

FIG. 17 is the front view of a round hanging pot.

FIG. 18 is the front view of a triangular hanging pot.

FIG. 19 is the front view of a rectangular hanging pot.

DETAILED DESCRIPTION

Wicktube

Figure 1:
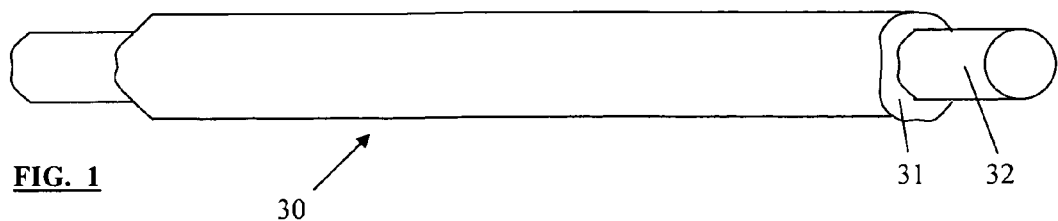
FIG. 1 is the front view of a piece of wicktube and its core.

Referring to FIG. 1, a wicktube 30 is a tube 31 which has a liquid absorbing core 32 inside. The liquid absorbing core 32 can be cotton or sponge, but not limited to only these materials. The wicktube 30 can transfer liquid from one end to the other end by capillary action.

Active Way and Passive Way

Figure 20:
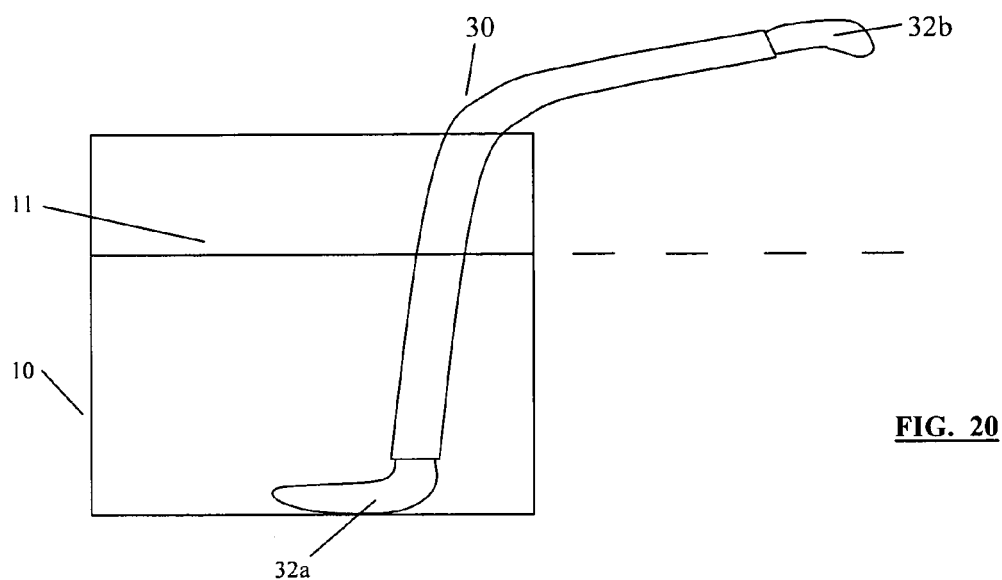
FIG. 20 is the front view of a piece of wicktube transferring liquid from a liquid reservoir in passive way.
Figure 21:
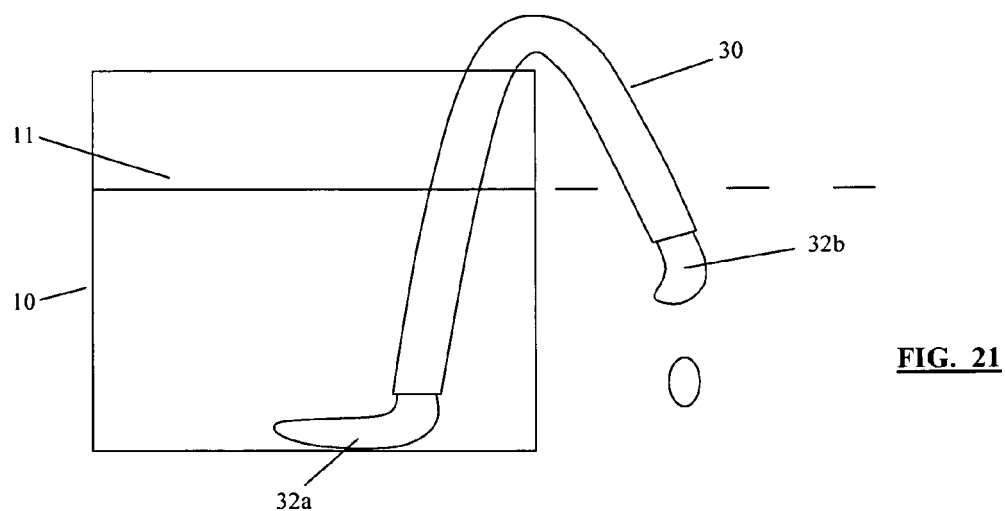
FIG. 21 is the front view of a piece of wicktube transferring liquid from a liquid reservoir in active way. The wicktube is used as a liquid dripper.

Referring to FIGS. 20 & 21, the core 32a on one side of the wicktube 30 is submerged in a liquid reservoir 10, and the core 32b on the other side of the wicktube 30 is outside the liquid reservoir 10. The core 32b outside the liquid reservoir shall keep wet by capillary action. If the core 32b is above the liquid level 11 of the liquid reservoir 10, as shown in FIG. 20, the core 32b just keep wet. This is the wicktube 30 transferring the liquid in passive way. But if the core 32b is below the liquid level 11 of the liquid reservoir 10, as shown in FIG. 21, the core 32b shall drip the liquid. This is the wicktube 30 transferring the liquid in active way. When operated in active way, the wicktube 30 can be used as a liquid dripper.

Wickconnector

Figure 11:
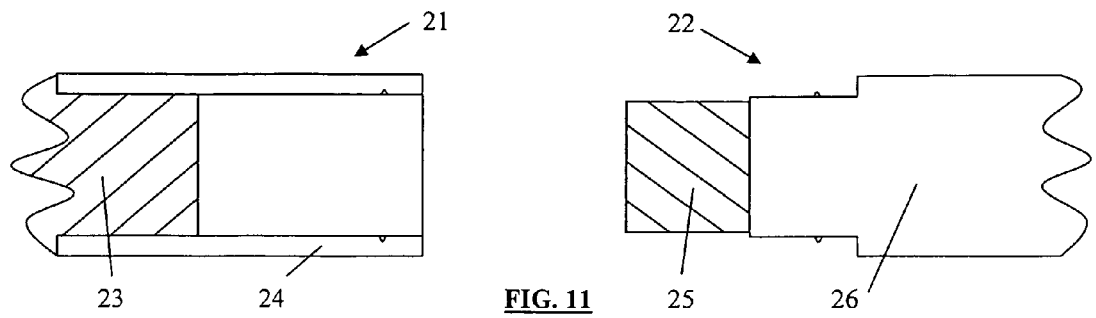
FIG. 11 is a cross sectional plan view of a male wickconnector and a female wickconnector when they are separated.
Figure 12:
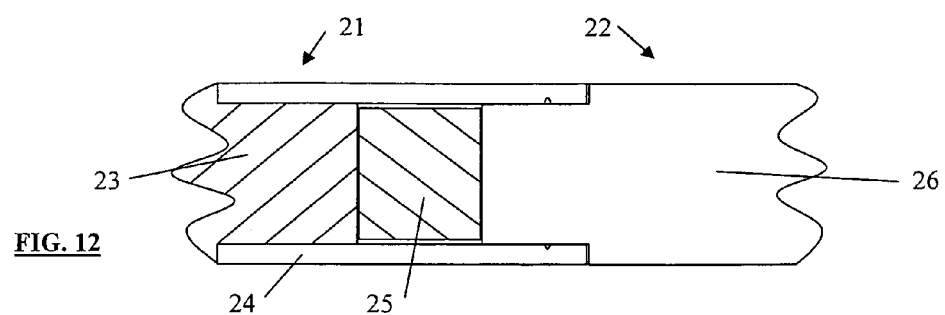
FIG. 12 is a cross sectional plan view of a male wickconnector and a female wickconnector when they are connected together.

Referring to FIG. 11, a female wickconnector 21 which has a liquid absorbing core 23 in a tube 24, and a male wickconnector 22 which has a liquid absorbing core 25 in a tube 26. In FIG. 12, the female wickconnector 21 and male wickconnector 22 are connected together. The core 23 of the female wickconnector 21 and the core 25 of the male wickconnector 22 are touched, so the liquid can be transferred between the male and the female wickconnector. When the female and male wickconnectors are connected together, they can be locked to prevent get loose.

Figure 13:
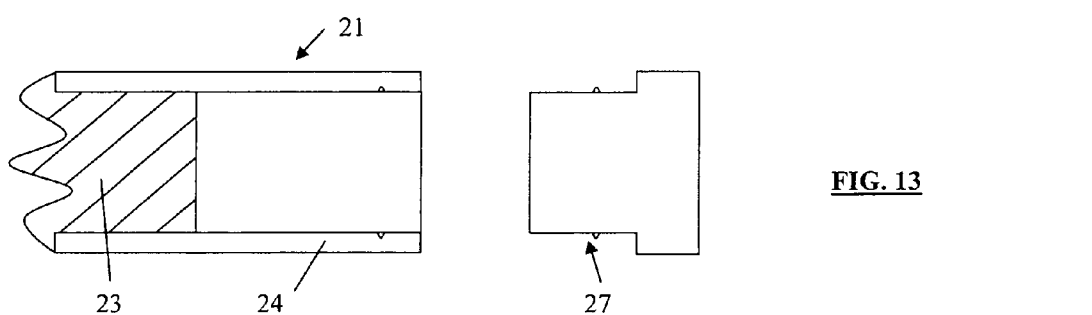
FIG. 13 is a cross sectional plan view of a female wickconnector and its cap.
Figure 14:
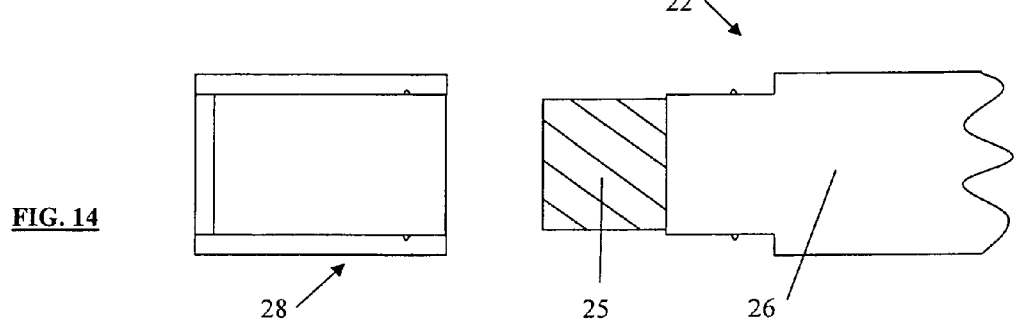
FIG. 14 is a cross sectional plan view of a male wickconnector and its cap.
Figure 20A:
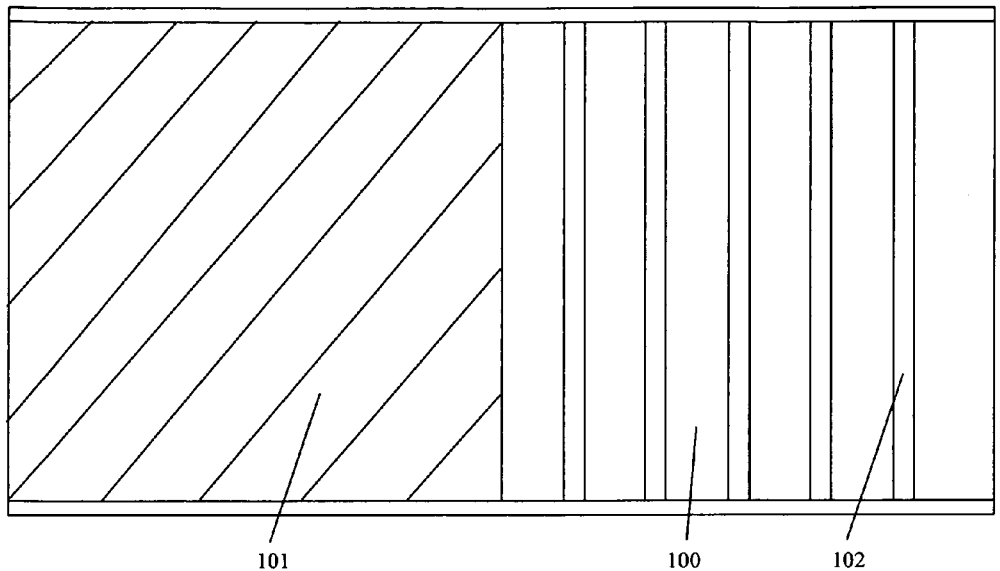
Figure 20B:
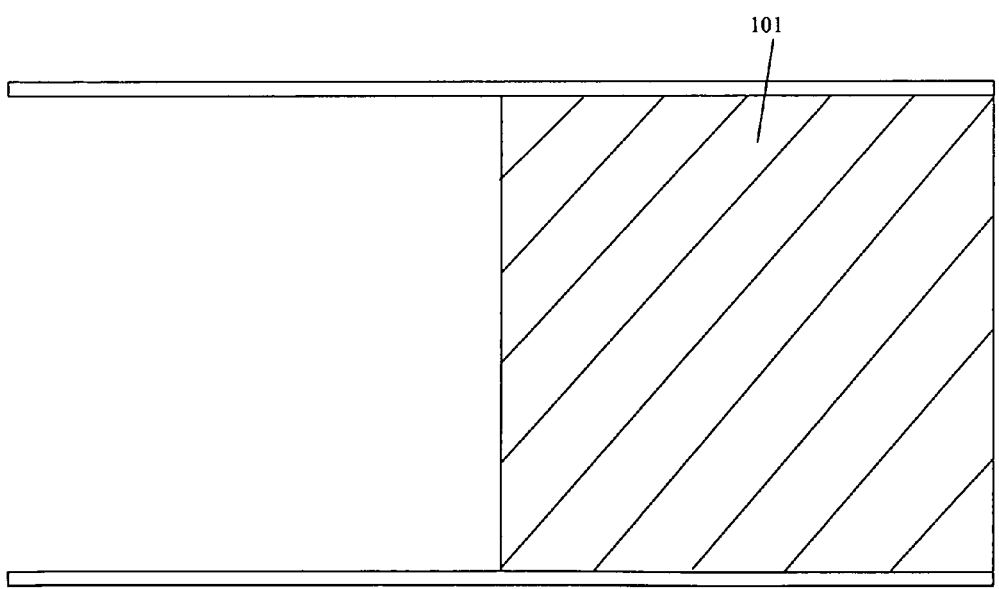

Referring to FIG. 13, a cap 27 can cover the female wickconnector 21 when it is not connected to anything to prevent liquid evaporation. For the same reason in FIG. 14, a cap 28 can cover the male wickconnector 22 when it is not connected to anything.

A wickconnector is a means to connect at least two liquid absorbing materials for transferring the liquid by capillary action between the liquid absorbing materials. FIGS. 11 to 14 is an example of the wickconnector.

Wickswitch

Referring to FIG. 2, one side of the moving part 40 of a wickswitch 48 is connected to 41 and the other side can change position. The moving part 40 changes position from a to b, so the liquid can be transferred between liquid absorbing material 41 and 42 through liquid absorbing material 40 by capillary action. The two pole wickswitch 48 is ON. And the moving part 40 changes position from b to a, so the liquid cannot be transferred between the liquid absorbing material 41 and 42. The two pole wickswitch 48 is OFF.

The wickswitch 48 is ON, the moving part 40 is in position b. The moving part 40 is either contact with the liquid absorbing material 42 to transfer the liquid, or not contact with 42 but the moving part 40 become a liquid dripper to drip the liquid to 42.

The wickswitch 48 is OFF, the moving part 40 is in position a. The moving part 40 is neither contact with the liquid absorbing material 42 nor a liquid dripper to 42. So the liquid is not transferring between the liquid absorbing material 41 and 42.

The wickswitch 48 is a means to start or stop transferring liquid by capillary action between at least two liquid absorbing materials, such like to control the liquid flow between the liquid reservoir 10, the wickhub 20, the wicktube 30, the plants, and some places in the wicknet. FIGS. 2, 3 & 5 are some examples of the wickswitch.

Referring to FIG. 3, another two pole wickswitch 48. The moving part 40 changes position from a to b, the moving part 40 contacts both the liquid absorbing material 41 and 42. So the liquid can be transferred between liquid absorbing material 41 and 42 through liquid absorbing material 40 by capillary action. The two pole wickswitch 48 is ON. And the moving part 40 changes position from b to a, the moving part 40 does not contact both the liquid absorbing material 41 and 42. so the liquid cannot transfer between the liquid absorbing material 41 and 42. The two pole wickswitch 48 is OFF.

Referring to FIG. 4, it is a timing diagram for the wickswitch. The wickswitch starts to transfer the liquid when the wickswitch is on, and the wickswitch stops to transfer the liquid when the wickswitch is off. The wickswitch can be controlled manually or automatically. Like electrical switch can be controlled by electromagnetic device to become a relay, wickswitch also can be controlled by electromagnetic device.

The wickswitch can switch to multiple positions to transfer the liquid. As shown in FIG. 5, the moving part 40 of the multiple pole wickswitch 48 can switch to the liquid absorbing material 42, 43, 44, or 45.

Wicknet

Figure 6:
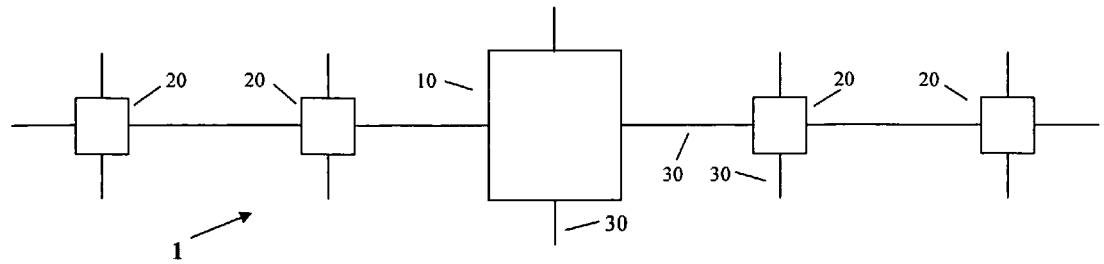
FIG. 6 is a block diagram of a wicknet.
Figure 7:
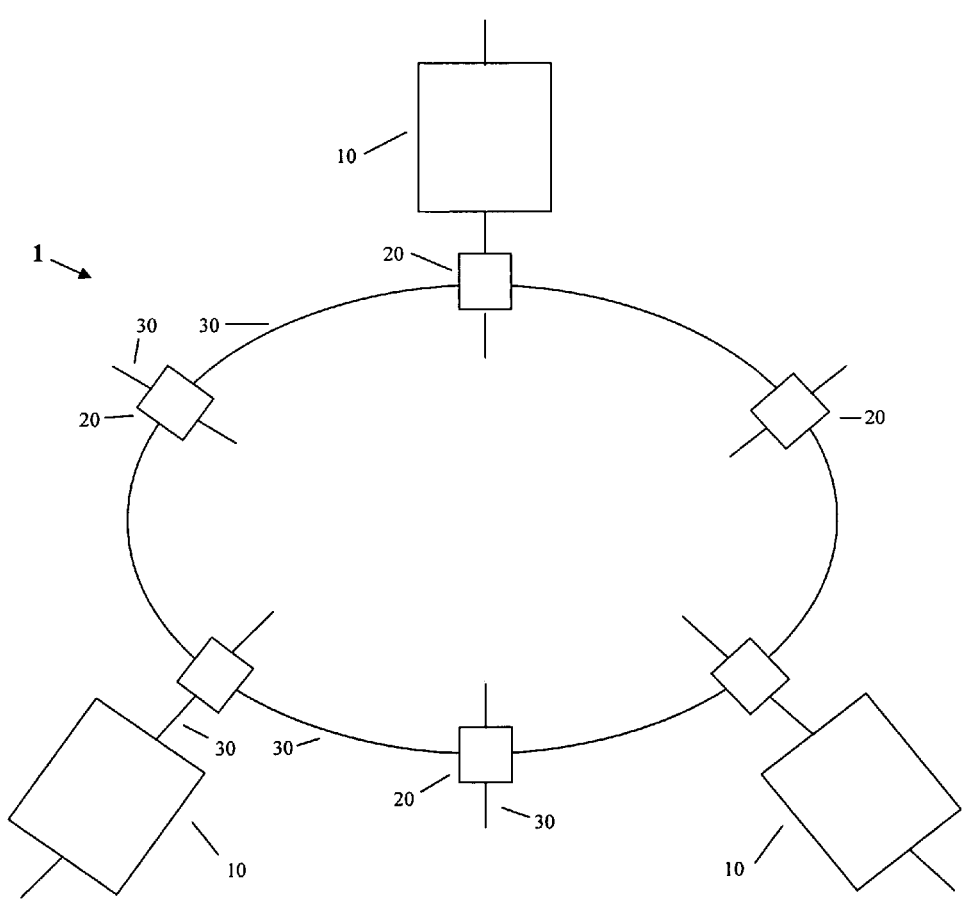
FIG. 7 is a block diagram of another wicknet.

Referring to FIGS. 6 & 7, a wicknet 1 has at least one liquid reservoir 10 interconnected with at least one wickhub 20, and at least one wicktube 30. The wickhub 20 is a wicktube hub where at least one wicktube 30 is connected. The wicktube can be used as a liquid dripper in active way. Wickconnectors are used to connect the elements in wicknet 1 for transferring the liquid by capillary action.

The liquid reservoir 10, wickhub 20, and wicktube 30 are interconnected together to form a network called wicknet 1. The purpose of wicknet 1 is to supply liquid to plants, like plants in a garden or farm. Wicknet 1 can even supply different kinds of liquid to different kinds of plants from different liquid reservoirs 10. The liquid may contain water, fertilizer, and other ingredients needed for plants.

The following table is a comparison of power net and wicknet. Like power net supply electrical current to electrical devices, wicknet supply liquid to plants.

|  | Power Net | Wicknet |
| --- | --- | --- |
| device | electrical Wire | Wicktube |
| medium | electron (hole) in metal | liquid in liquid absorbing material |
| driving | voltage difference | capillary action |
| force | electrical current from high voltage to low voltage | liquid from wet to drier area |
| speed | fast | slow |
| connector | electrical connector | Wickconnector |
| switch | electrical switch | Wickswitch |
| distribution | distribution panel | Wickhub |
| source | power supply | liquid reservoir |
| pressure regulation | voltage regulator keeps voltage constant | constant water level of liquid reservoir keeps liquid pressure constant |
| purpose | supply electrical current to electrical devices | supply liquid to plants |

Controller and Sensors

An electronic controller can be added to manage the wicknet's operation. And some temperature sensors, humidity sensors, liquid level sensors and other kinds of sensors can also be added to the wicknet. According to the sensor's information, and expert's suggestion, the controller can control the wickswitch and supply suitable amount of the suitable liquid to each individual plant. Artificial sun light can also be used if necessary.

Liquid Reservoir

Figure 8:
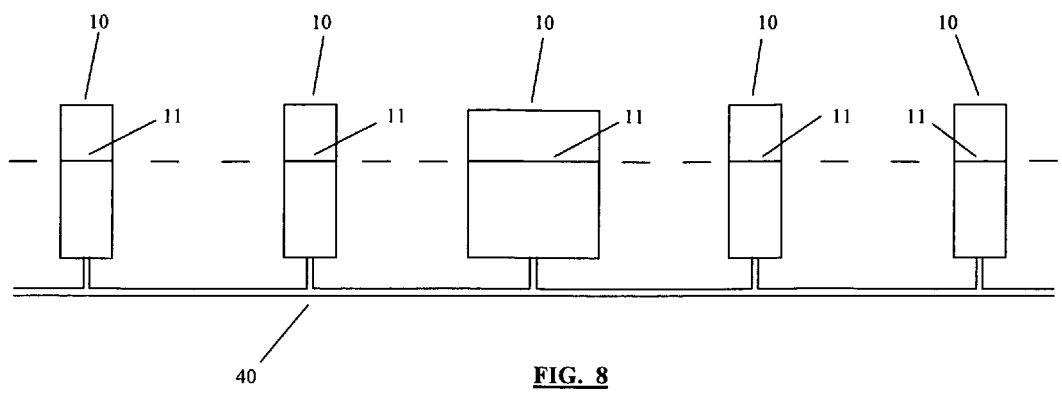
FIG. 8 is a cross sectional plan view of several liquid reservoirs which are connected together with a tube to keep the liquid level of these liquid reservoirs all at the same height.
Figure 9:
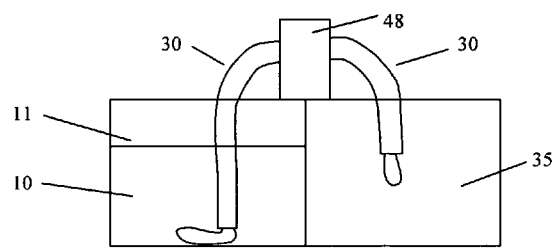
FIG. 9 is a cross sectional plan view of a wickswitch controlling the liquid transferring of a liquid reservoir.

Referring to FIG. 8, five liquid reservoirs 10 are connected together with tube 40. The liquid in these five liquid reservoirs can flow to each other, so the liquid level 11 of these five liquid reservoirs are all at the same height. In FIG. 9, a wickswitch 48 control the liquid transferring of a liquid reservoir 10. The left wicktube 30 in the liquid reservoirs 10 transfers the liquid to the wickswitch 48 which can block the liquid or let the liquid pass to the right wicktube 30 on device 35. The device 35 can be a mount device, a pot or any elements of a wicknet.

Figure 10:
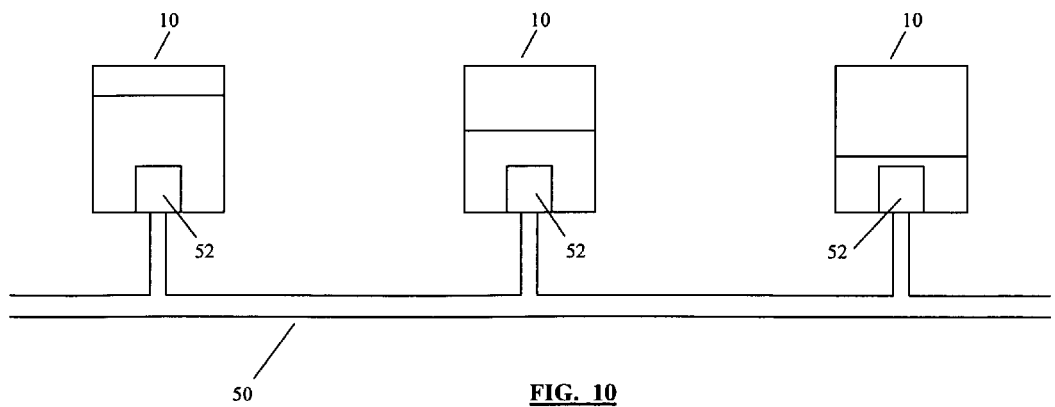
FIG. 10 is a cross sectional plan view of several liquid reservoirs each has its own valve.

Referring to FIG. 10, three different liquid reservoirs 10 each has its own valve 52. These valves 52 are connected to a pipe 50. The pipe 50 is the liquid supply pipe. These valves 52, either manually operated or automatically operated, can be open or closed to let the liquid in pipe 50 flow into the liquid reservoirs 10.

Keeping the liquid level of the liquid reservoir constant can keep liquid pressure constant.

Hanging Devices for Plants

Referring to FIGS. 15 to 19, the wicktube 30 supply the liquid to different hanging devices for plants. The Wicktube 30 gets the liquid from a local attached liquid reservoir or from the wicknet. In FIG. 15, a hanging box or basket 90, hangs on a frame 95 which is attached to the wall 96. The wicktube 30 supply the liquid to the root of the plant, or to the medium around the root of the plant, in the box or basket 90. In FIG. 16, the wicktube 30 supply the liquid to the plant which grow on the surface of the mount device or mount board 60.

In FIGS. 17 to 19, there are different hanging pots. The flat side 83 is hanging against the wall and the other sides 84 are round (FIG. 17), triangular (FIG. 18), rectangular (FIG. 19), or other different shapes. The wicktube 30 supplies the liquid to the root of the plant, or to the medium around the root of the plant, in these hanging pots.

There are holes 85 on the sides, or bottom, of the hanging pots for airflow. Windows can also be used for these hanging pots.

Windows for Pots

Figure 29:
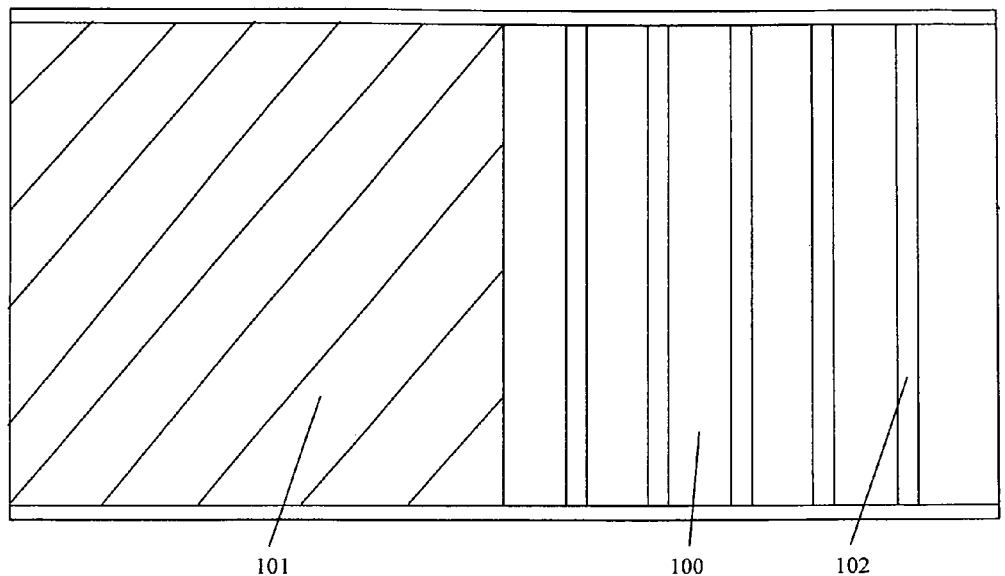
FIG. 29 is the front view of an opened window for pot.
Figure 30:
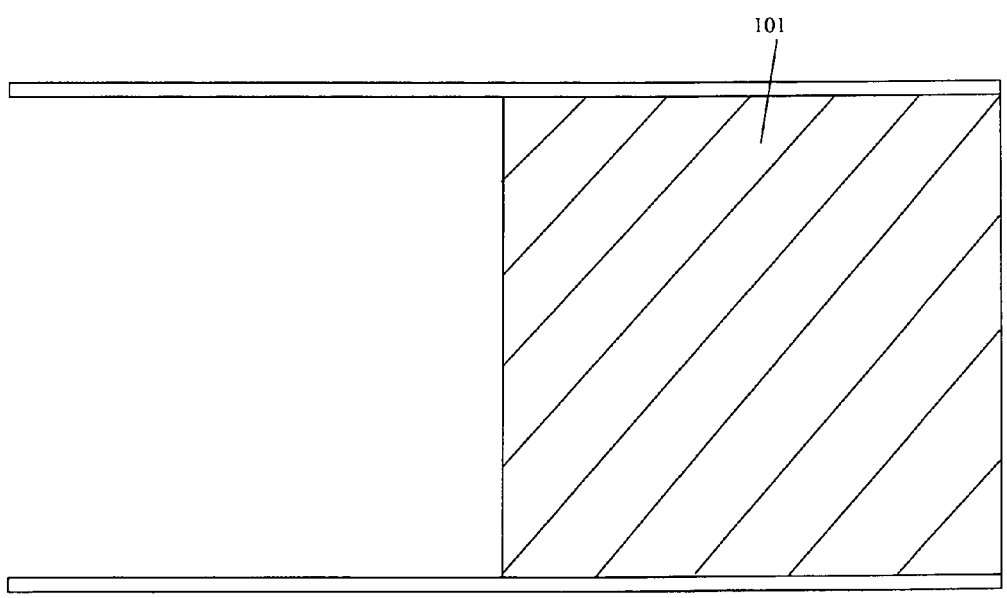
FIG. 30 is the front view of a closed window for pot.
Figure 31:
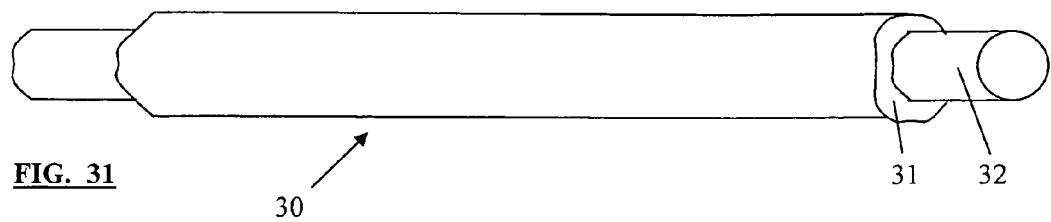
Figure 32:
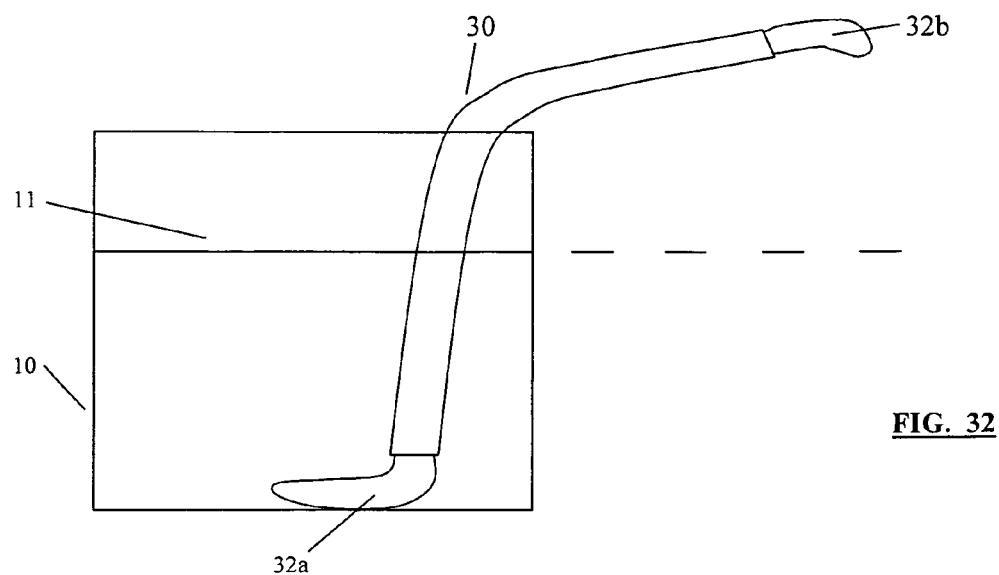
Figure 33:
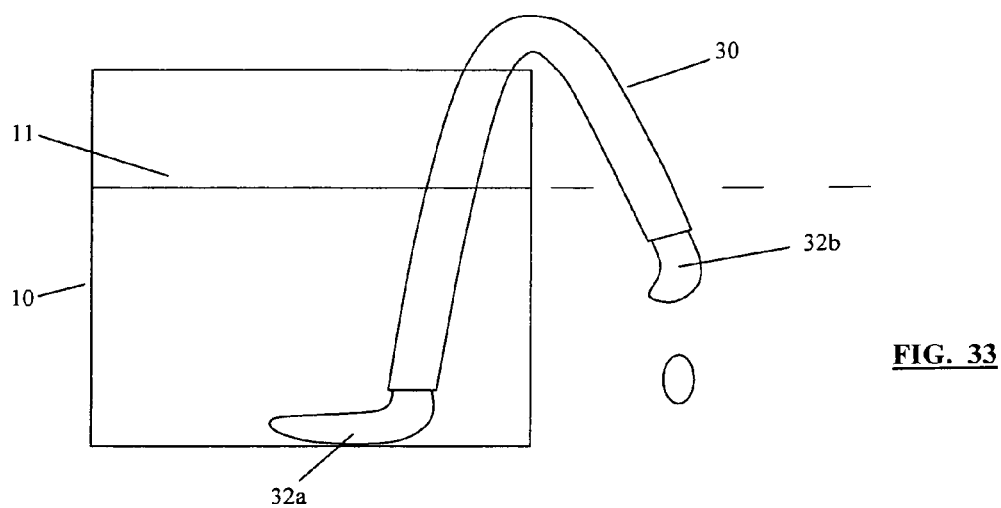

Some plants, like orchids, need good airflow for its root. So a new concept is introduced, it is a variable size hole for pots. In other words, it is a window for pots. As shown in FIG. 29, window cover 101 is fully opened. On the open hole 100, there are some blocks 102 to prevent the medium for root to fall out. In FIG. 30, the window cover 101 is fully closed.

The window cover 101 can stay in any position between fully opened and fully closed. So the hole 100 is a variable size hole. Because wicktube only keeps the root of the plant moist, the pot does not have a water drainage problem. This variable size hole is used to adjust the humidity level around the root of the plant.

Self Watering Mount Devices for Plants

Figure 22:
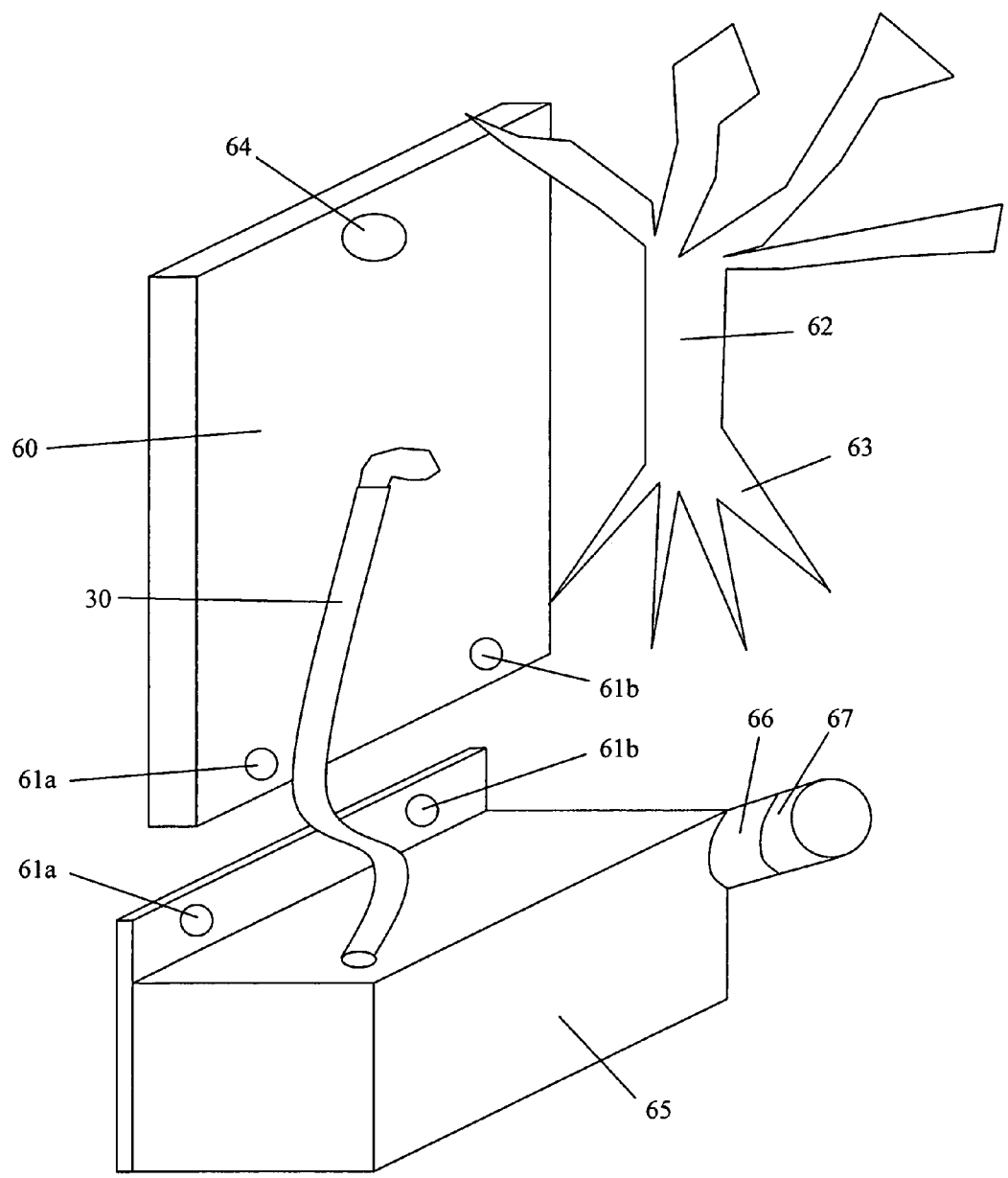
FIG. 22 is the side perspective view of a mount device and its attached liquid reservoir.
Figure 24:
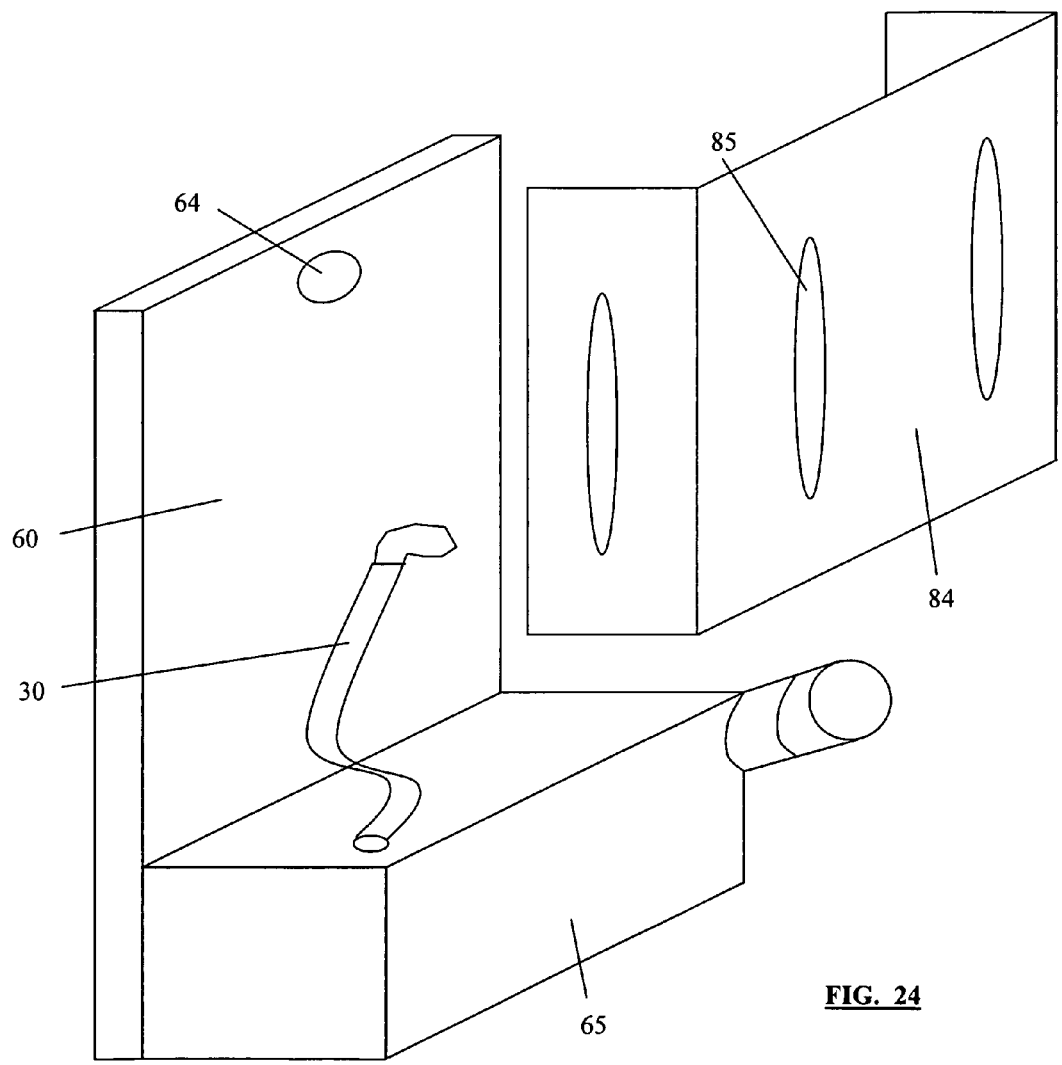
FIG. 24 is the side perspective view of a mount device, its attached liquid reservoir and its cover.

Referring to FIG. 22, a local liquid reservoir 65 is attached to a mount device or mount board 60. Holes 61a can be tied together, the same for holes 61b. Plant 62 grows on the surface of the mount device 60. Wick tube 30 supplies the liquid from the local liquid reservoir 65 to the root 63 of the plant 62, or to the medium around the root 63 of the plant 62. Hole 64 is used for hanging the mount device 60 and the hole 66 is used for refill the local liquid reservoir 65. Cap 67 is used to cover the hole 66. Referring to FIG. 24, the mount board 60 can also be a part of the liquid reservoir 65.

Figure 23:
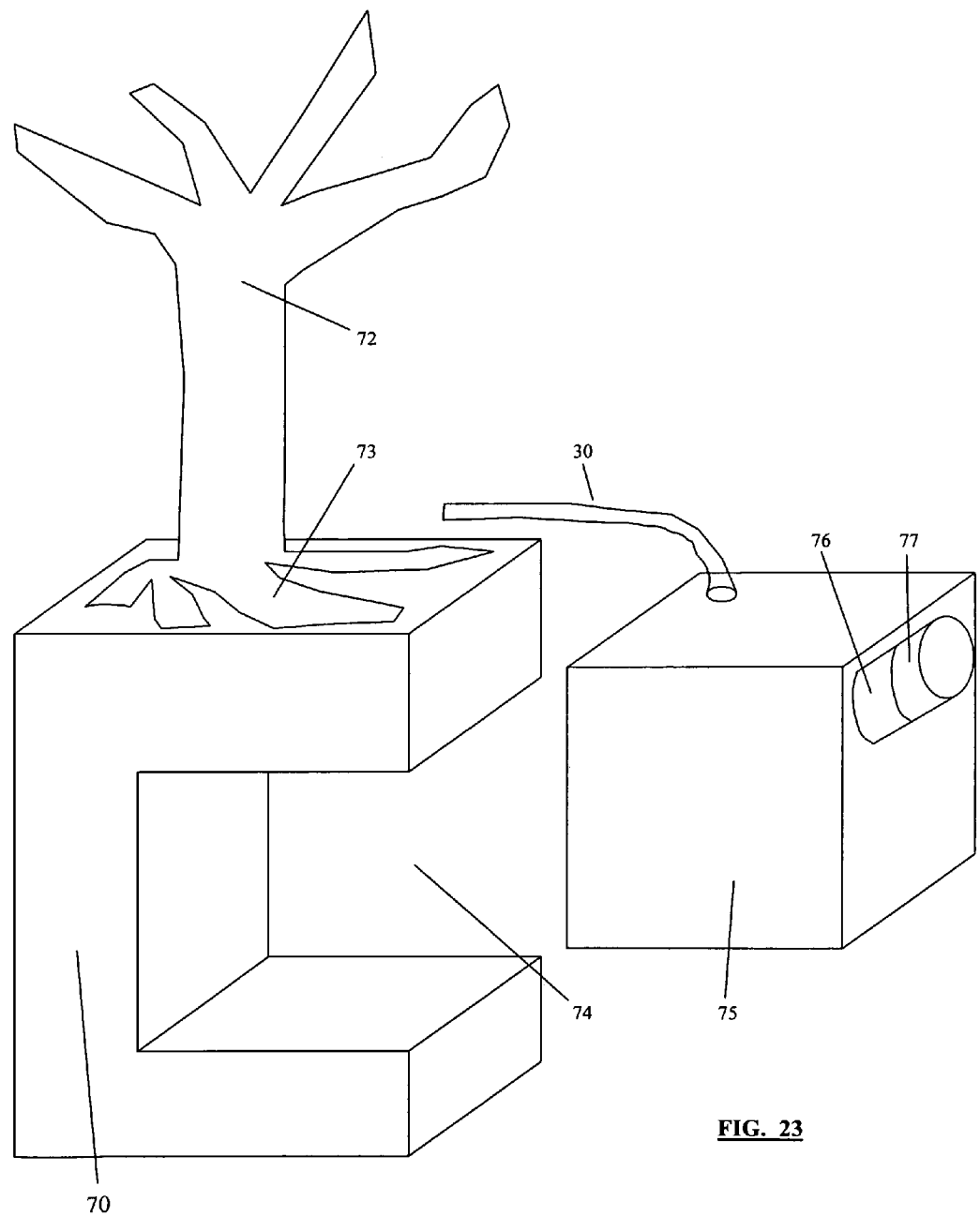
FIG. 23 is the side perspective view of a different mount device and its attached liquid reservoir.

FIG. 23 shows a different mount device 70. It can be a piece of wood or rock. Plant 72 grows on the surface of the mount device 70. A local liquid reservoir 75 is attached to the mount device 70. The liquid reservoir 75 can be put in the empty space 74. Wicktube 30 supplies the liquid from the liquid reservoir 75 to the root 73 of the plant 72, or to the medium around the root 73 of the plant 72. Hole 76 is used to refill the liquid reservoir 75 and the cap 77 is used to cover the hole 76.

The mount device can have different shapes and be made from different materials. No more the endangered tree fern fiber is needed. The attached local liquid reservoirs can also have different shapes and be made from different materials. Some plants, like orchids, prefer to grow on the surface of the mount devices.

The wickswitch can be used to control the liquid transferring on the mount device.

Figure 25:
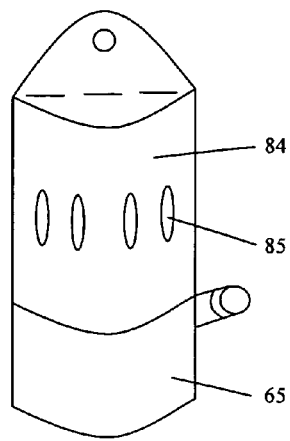
FIG. 25 is the front view of a round hanging pot with attached liquid reservoir.
Figure 26:
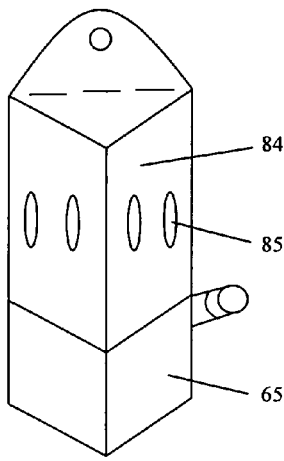
FIG. 26 is the front view of a triangular hanging pot with attached liquid reservoir.
Figure 27:
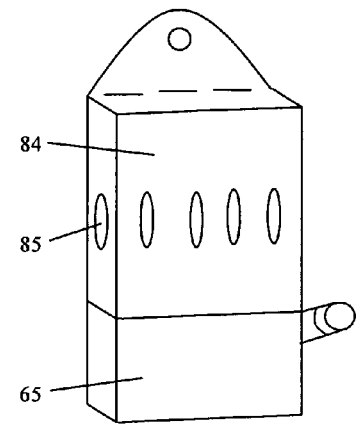
FIG. 27 is the front view of a rectangular hanging pot with attached liquid reservoir.

In order to hold more medium for the root of the plant, a cover 84 is added to the self watering mount device as shown in FIG. 24. So the self watering mount device become a self watering hanging pot, like those hanging pots in FIGS. 17 to 19 except a local liquid reservoir 65 is attached. The cover 84 can have different shapes and has holes or windows 85 to let air flow. FIGS. 25 to 27 are examples of different self watering hanging pots.

Frame Holder

Figure 28:
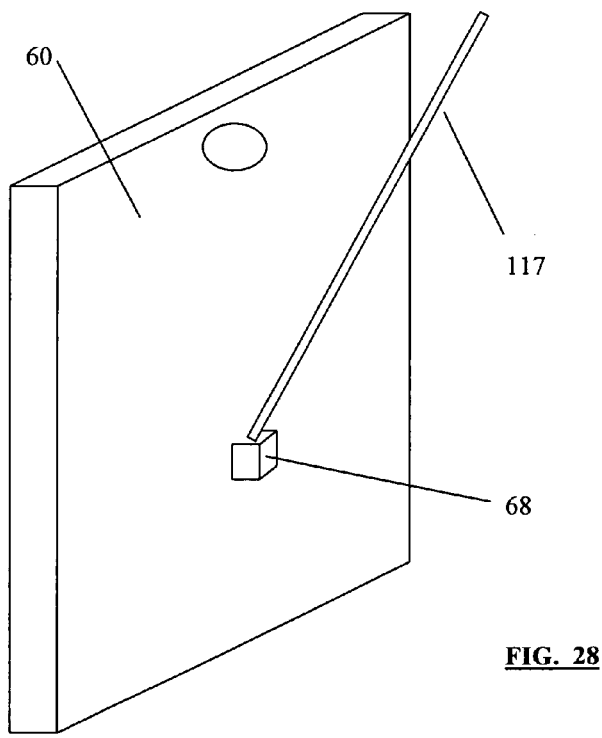
FIG. 28 is the front view of a frame holder on the mount device.

As shown in FIG. 28, a frame holder 68 is attached on the surface of a mount device 60. The frame holder 68 is used to hold a frame 117 that is used to hold the flower or the branches of the plant on the mount device 60.

Garden, Farm

The wicknet combines wickhubs, wicktubes, and liquid reservoirs to form a network. This network and wickswitches can control the liquid supply to the plants in a garden or farm. The liquid supply control can be precise if electronic controllers and some sensors are added. It is simple, slow, clean, and use only minimum amount of liquid.

Hanging Garden

So we can even hang these plants on the wall to form a garden on the wall, a hanging garden. Gardens usually need land, but the hanging garden does not need it. The hanging garden uses the wall, a so far rarely used space. Capillary action can transfer liquid in a vertical direction, it is suitable for the garden on the wall. Then every building, every house, even every room can have its own beautiful, private hanging garden. And it is easy to maintain this garden. A green room, green house, green school, green office, green factory, green airport, even green mall shall not be too far from us now.

Plant Shipping Container

The wicknet can be used in a shipping container for plant shipment. The wicknet can supply moist to the plants in the shipping container. And the shipping container can further including windows on top or side for light, or artificial sun light.

What is claimed is:

1. A wickswitch controlled plant watering circuit comprising: a) at least one liquid reservoir; b) at least one wicktube, wherein said wicktube has a core of liquid absorbing material that transfers liquid from one end to another end of the wicktube by capillary action to supply a liquid to plant roots or growing medium; c) at least one wickswitch, said wickswitch open and closes the capillary circuit; wherein said wickswitch has at least one manually or automatically movable part containing a liquid absorbing material, said wickswitch starts and stops transfer of liquid by capillary action between the at least one liquid reservoir and the plant roots or growing medium by bringing the liquid absorbing material of the movable part in and out of contact with the liquid absorbing material of the at least one wicktube.

2. The invention of claim 1, at least one wickconnector comprises a male tube containing a core liquid absorbing material and a female tube containing a core liquid absorbing material connected together so that the cores touch and transfer liquid by capillary action.

3. The invention of claim 1, further comprising: a wicknet which includes a wickhub.

4. The invention of claim 3, can be used in a garden or farm, said wicknet supplies said liquid to plants in said garden or farm, and said wickswitch manually or automatically controls said liquid transferring.

5. The invention of claim 4, wherein some or all of said plants can be hung on a wall to form a garden on the wall, a hanging garden.

6. The invention of claim 3, can be used in a shipping container for plant shipment, said wicknet supplies said liquid to said plants in said shipping container and said wickswitch controls said liquid transferring, and said shipping container further including windows on top or side for light.

7. The invention of claim 3, wherein some liquid reservoirs are connected with tubes, so the liquid level of these said liquid reservoirs are kept at the same height.

8. The invention of claim 3, wherein some liquid reservoirs further including valves and said valves are connected to a liquid supply pipe, and said valves can be automatically or manually opened and closed to get said liquid into said liquid reservoir.

9. The invention of claim 1, wherein some said wickswitches can be controlled by computer or controller to supply said liquid to plants automatically when electromagnetic device or some similar function device is added to control the movement of said movable part.

10. The invention of claim 9, further including temperature sensors, humidity sensors, or other kinds of sensors to send temperature, humidity, or other information to said computer or said controller.

11. The invention of claim 1, said at least one wicktube can be used as a liquid dripper when one end of said wicktube is submerged in a liquid reservoir and the other end of said wicktube outside said liquid reservoir is below the liquid level of said liquid reservoir.

12. The invention of claim 1, further including a mount device, so said liquid be sent to the plant on said mount device can be controlled by said wickswitch.

13. The invention of claim 12, further including a frame holder used to hold flowers or the branches of said plant on said mount device.

14. The invention of claim 12, further including a device used to create a self-watering mount device by attaching said liquid reservoir to said mount device.

15. The invention of claim 1, further including a pot which has holes or windows on its side or bottom to let air flow, so said liquid sent to the plant in said pot can be controlled by said wickswitch and said window size is variable.

16. The invention of claim 15, wherein said pot has one flat side where it can be hung on a wall and the other sides may have different shapes.

\* \* \* \* \*